May 22, 1923.
W. F. LAMOREAUX
PROCESS AND APPARATUS FOR MAKING SULPHURIC ACID
Filed Aug. 16, 1921     3 Sheets-Sheet 1
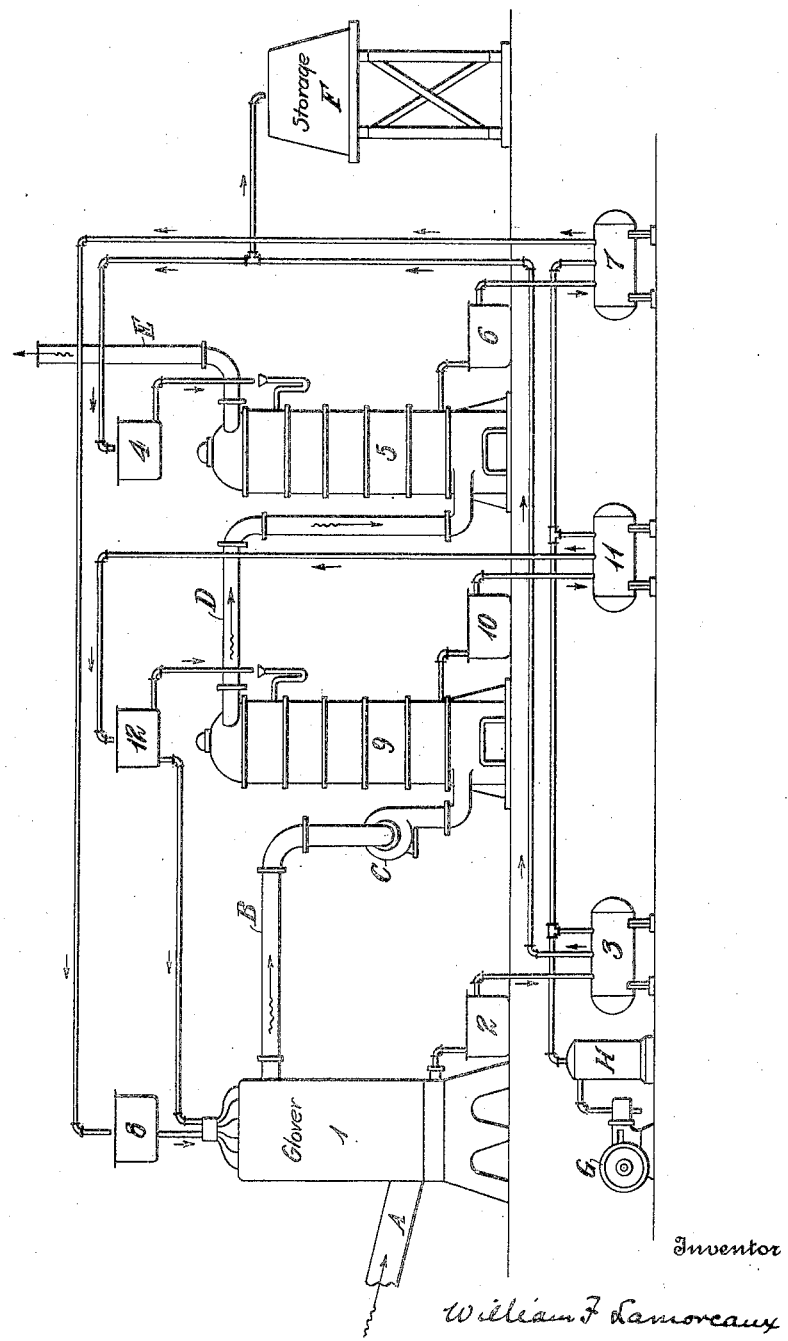

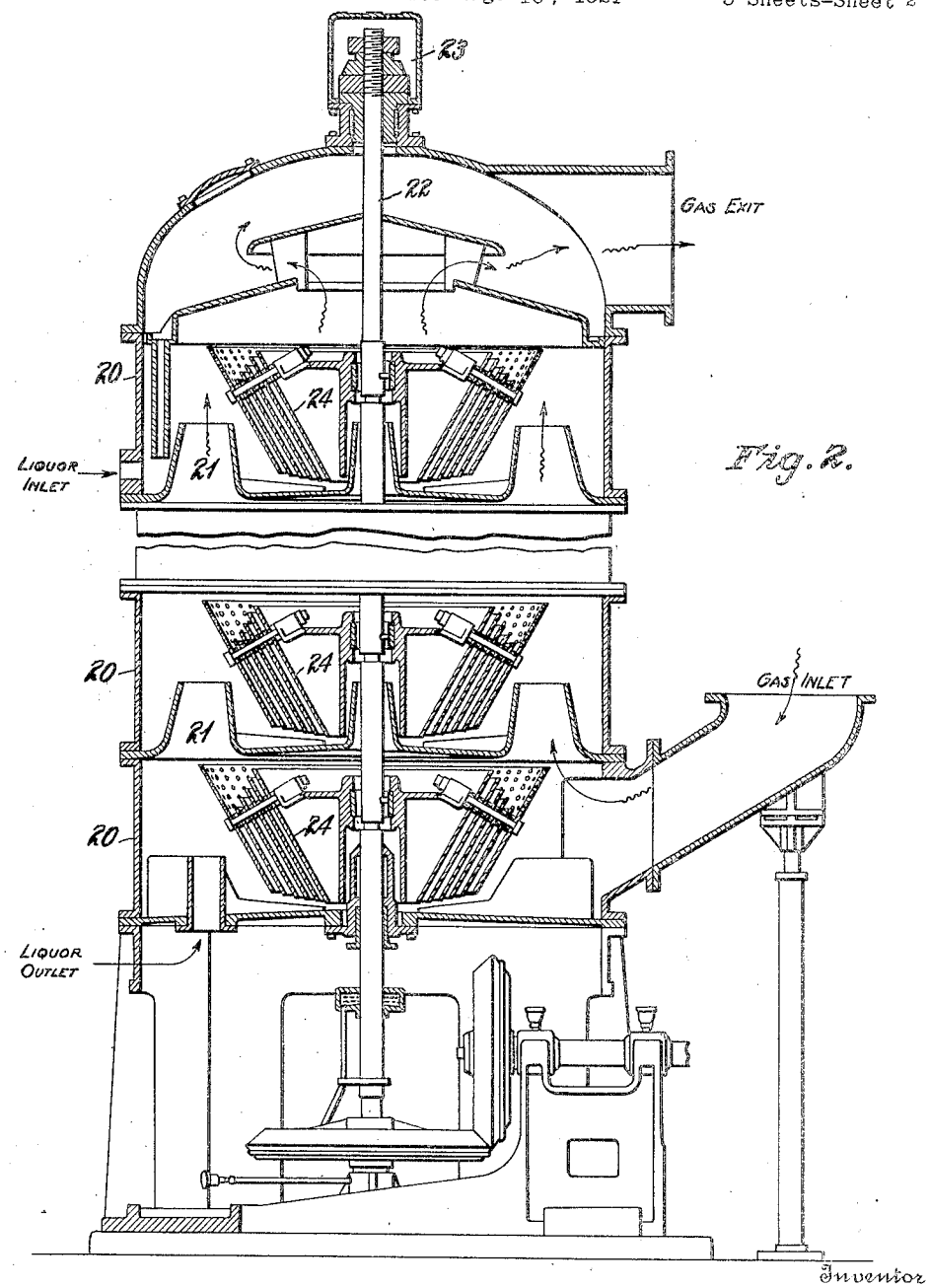

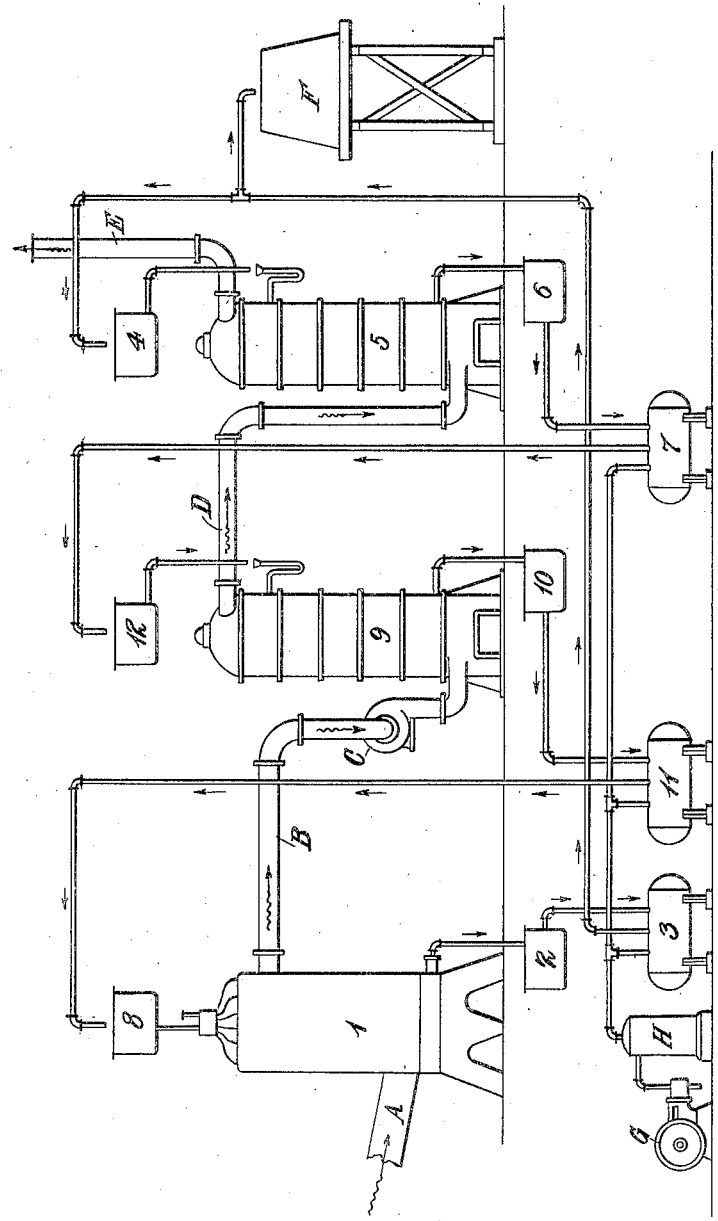

Patented May 22, 1923.

1,456,064

UNITED STATES PATENT OFFICE.

WILLIAM F. LAMOREAUX, OF ISABELLA, TENNESSEE.

PROCESS AND APPARATUS FOR MAKING SULPHURIC ACID.

Application filed August 16, 1921. Serial No. 492,673.

*To all whom it may concern:*

Be it known that I, WILLIAM F. LAMOREAUX, a citizen of the United States, residing at Isabella, in the county of Polk and State of Tennessee, have invented certain new and useful Improvements in Processes and Apparatus for Making Sulphuric Acid, of which the following is a specification.

This invention relates to an improved process or method of producing sulphuric acid from sulfur dioxide obtained from the burning of elemental sulfur, or from the oxides of sulfur such as are contained in variable admixture with air in the gases generated by or liberated from any furnace smelting, roasting or calcining pyrite ores or other sulfurbearing materials. My invention further relates to improvements in the apparatus which is used in the manufacture of sulphuric acid and especially to the supplementing of the usual chambers and Gay-Lussac towers, or indeed the substitution therefor, with apparatus such as will increase the quantity of acid produced in a given amount of reaction space and in a given interval of time and with a less amount of labor and materials, this being accomplished by the introduction of mechanical means for inducing and maintaining a rapid and constant intensive commingling of the acid making materials thereby providing for a rapid and thorough bringing into contact of the molecules of all of the reacting fluids both gaseous and liquid, as will be hereinafter more fully set forth in such manner as may be clearly understood and practiced by those versed in the manufacture of sulphuric acid by the "chamber" process.

The usual chamber acid plant consists of four distinct parts arranged in the following order: (*a*) The nitrating apparatus, (*b*) the Glover towers, (*c*) the acid chambers, and (*d*) the Gay-Lussac towers;—in addition, there is commonly the pumping systems for the circulation of the gases and liquids, but the construction and functions of all of these parts of equipment are so well known that description is quite unnecessary. The reactions that actually take place in the towers and chambers are, however, rather obscure, although the combined results of these reactions are as though the reaction was $$2SO_2 + O_2 + 2H_2O = 2H_2SO_4 \qquad (1)$$

However, the acid producing reactions will not take place without the intermediary agency of certain nitrogen oxides, and, therefore, the theory of the chemistry of these reactions will be presently briefly outlined.

The fundamental reactions taking place in the manufacture of sulphuric acid are accepted to be theoretically as follows:—

$$2SO_2 + 2NO + 3O + H_2O = \\ 2HSNO_5 \text{(nitroso-sulphuric acid)} \qquad (2)$$

$$2HSNO_5 + 2H_2O + SO_2 = \\ 3H_2SO_4 + 2NO \qquad (3)$$

Probably the most representative equation for the combined reaction is $$2NO + SO_2 + O + H_2O = \\ H_2SO_4 + 2NO \qquad (4)$$

The reactions are cyclical and depend upon the action of nitric oxid, NO, as the catalytic agent.

The gases, composed of sulfur dioxid, (at times, carbon dioxid), oxygen and nitrogen, in varying proportions, are led through a dust-settling chamber, thence through flues to the Glover towers. Usually, in the flues immediately preceding the Glover towers is placed the nitrating apparatus, consisting of cast-iron retorts, heated to a temperature of 450 to 550 degrees centigrade by the hot furnace gases. Into these retorts there is periodically introduced sodium nitrate and sulphuric acid, which reacts as follows:—

$$NaNO_3 + H_2SO_4 = NaHSO_4 + HNO_3 \qquad (5)$$

The nitric acid thus produced reacts immediately with the sulfur dioxid present as follows:—

$$HNO_3 + SO_2 = \\ HSNO_5 \text{(nitroso-sulfuric acid)} \qquad (6)$$

The nitroso-sulphuric acid, upon entering the Glover tower is next decomposed according to the reaction (3).

Commencing in the Glover tower, the two reactions, (2) and (3), continue (in the presence of excess oxygen and water)

throughout the system as long as there is any $SO_2$ present to enter into the reaction; a sufficient quantity of oxygen and water, (the latter usually in the form of spray or low pressure steam) being introduced as conditions require.

As the $SO_2$ is used up, the following reaction, increasing in inverse ratio, takes place:—

$$2HSNO_5 + H_2O = 2H_2SO_4 + N_2O_3 \text{ (nitrous anhydrid)} \quad (7)$$

The volume of furnace gases taken into the acid plant should be such that the last remaining portion of sulfur dioxide is reacted upon in the last or "rear" chamber of the system, thus giving the maximum amount of space for acid making, and therefore, the highest operating efficiency, leaving the way clear for the following reaction to take place in the Gay-Lussac towers:—

$$2H_2SO_4 + N_2O_3 = 2HSNO_5 + H_2O \quad (8)$$

The function of the Gay-Lussac tower is to recover and accumulate the nitrous compounds, principally as nitroso-sulphuric acid, thus to enable them to be returned to the Glover tower and there to be denitrated and so resume the intended cyclic order of the process.

If there be taken into the system more $SO_2$ than will completely react in the chambers, so that any considerable amount of $SO_2$ is carried over into the Gay-Lussac towers, then the reaction (3) will take place there, preventing to a great extent reaction (8) and furthermore, since nitric oxid, NO, is not absorbed to any extent by sulphuric acid (except in the presence of a great excess of free oxygen), there results a heavy loss of niter at the Gay-Lussac tower exist.

If there should occur at any time a great excess of $SO_2$ in the chambers, so that it encounters either NO or $N_2O_3$ in the presence of water or very dilute sulphuric acid, a reduction to $N_2O$ occurs and the latter, being a stable compound, is unaffected by any substance it may subsequently meet in the system, and results in a total loss, thus:—

$$SO_2 + 2NO + H_2O = H_2SO_4 + N_2O \text{ (nitrous oxide)} \quad (9)$$

If on the other hand, there is not enough $SO_2$ present in the chambers, the efficiency of the plant decreases giving a low yield of acid and a considerable amount of niter is oxidized according to the reaction:—

$$HSNO_5 + H_2O + O = H_2SO_4 + HNO_3 \quad (10)$$

The latter reaction is particularly to be avoided for not only does it result in loss of niter but also rapidly destroys the lead-work of the chambers and connections.

With an excess of water in the chambers, the acid formed will of course be too weak, but the greatest danger under this condition is the fact that when the lower oxides of nitrogen meet with an excess of oxygen (which is always present in the chambers) and an excess of water, at the same time, the following reactions take place:—

$$2NO + 3O + H_2O = 2HNO_3 \text{ (nitric acid)} \quad (11)$$
$$N_2O_3 + 2O + H_2O = 2HNO_3 \quad (12)$$

The nitric acid so formed is not only a much less efficient carrier of oxygen than nitrous acid, but it is dissolved in the bottom acid in the chambers, assisting the acid forming process very little, and meanwhile acts upon and dissolves the lead. When this state of affairs has once set in, it is not always easily remedied, as cutting off the steam is not sufficient; much more niter must be added to the circulation as well and in the meantime the yield of sulphuric acid falls off, the consumption of niter increases very much and the action of the nitric acid on the chamber lead does permanent damage. An excess of steam not only assists in the formation of nitrous oxide as shown in reaction (9) but may even cause a portion of the nitrous oxide to be reduced to elementary nitrogen, neither of which can be re-oxidized or absorbed and are, therefore, completely lost.

With a deficiency of water, a large quantity of nitroso-sulphuric acid will be left undecomposed and by excessive concentration of the acid accumulating in the bottom of the chambers, will hold more niter in solution, thus removing it from the atmosphere of the chambers and so losing its aid in oxidizing $SO_2$.

The necessity of exact regulation of the quantities and proportions of the various acid forming materials must be fully appreciated in practice, otherwise heavy losses in revenues will be sustained through lack of both efficiency and economy in production.

Furthermore, the regulation of temperature and pressures throughout the system demands the utmost care and attention;—too low a temperature retards the chemical reactions while a temperature above 100 degrees centigrade prevents the condensation of water and thus interferes with one of the most important reactions; namely, the decomposition of the nitroso-sulphuric acid. The temperature control must, therefore, be kept constantly within a rather narrow range.

It will be observed, in the above equations, that most of the reactions between the gaseous materials are of exothermic nature and result in the formation of compounds that may be readily condensed to liquids, therefore, in accordance with the laws of physical-chemistry increase in pressure with simultaneous dissipation of heat will be conducive to acceleration of these reactions. Furthermore, since the reactions take place principally in the gaseous phase, the removal of the products of reaction in the form of the liquid phase tends to augment the reactions, thus the oxidation of sulfur dioxide is accelerated by the addition of atomized water because the water readily combines with the sulfur trioxid formed and removes it from the gaseous phase.

It will also be observed in the above equations, that in most instances, two or more molecules of reacting agents combine to form a less number of reaction products, and again it may be noted that such combination of two or more gases into smaller volume or the conversion of gases into liquids by direct combination or absorption dictates the reduction of temperature and increase of pressure, therefore, these two variables should be kept, at all times, under careful control.

Different gases are differently soluble in a given liquid, but in the ordinary cases of solution of gases in liquids, the individual gases of a mixture dissolve according to their partial pressures, the solubility of each being but slightly affected by the presence of the other, and the amount of gas which a liquid will dissolve is directly proportional to the pressure of the gas mixture in contact with the liquid; therefore, a liquid will continue to absorb a gaseous constituent from a gas mixture until the pressure exerted by the dissolved gas is equal to its partial pressure in the gas mixture.

The pressure exerted by the dissolved gas, as measured by its tendency to pass from the liquid phase to the gaseous phase, is quite analogous to the vapor pressure possessed by all substances, and acting in opposition to these stresses we have the commonly known force of "surface-tension".

The surface-tension of a liquid always decreases with increase of temperature and the addition of substances soluble in the liquid usually results in the depression of the surface-tension. It is also commonly observed that the surface tension of a small body (having a high degree of curvature) is less than it would be for a larger body of the same substance, therefore, a small drop of liquid has a greater tendency to volatilize than a larger one.

The molecules in the surface layer of a liquid are attracted to each other by forces of different magnitude than those acting between the molecules within the liquid; the molecules in the surface layer arrange themselves largely without reference to the underlying liquid; and there is believed to occur an unequal distribution of the molecules at the boundary between the liquid and gaseous phases; thus giving rise to the phenomena of "surface-tension" and "adsorption", and upon these phenomena the solubility of a gas in a liquid is largely dependent. A liquid may both absorb and adsorb a gas but "adsorption" may be defined as the condensation of gases upon the surfaces of liquids or solids. The amount of adsorption in any given case is proportional to the area of the exposed surface of the liquid or solid; therefore, a highly dispersed material may exhibit a very large adsorbing power owing to the enormous surface exposed, but it is also variably dependent upon the chemical nature and physical condition of the two phases in contact It is strictly a surface phenomenon and to it most, if not all, of the obscure catalytic reactions may be attributable.

It is believed that the surface energy of a liquid is not a property of the molecule as a whole, but depends only on the least active portions of the molecule and on the manner in which these are able to arrange themselves in the surface layer,—that is to say, the molecules are believed to arrange themselves in the surface-layer in such a way that their active portions are drawn inward, leaving the least active portion of the molecule to form the surface.

Therefore, in order to accelerate or augment those chemical reactions which take place between a liquid phase and a gaseous one, it is highly desirable that the adsorbed films which form upon the surfaces of the liquid be disrupted or removed substantially as soon as formed in order that new reactive surfaces may be exposed to the gaseous phase.

For the reasons set forth in the foregoing, it is quite evident that the rapidity and completeness of all of the physical and chemical reactions involved in the manufacture of sulphuric acid are, in a great measure, dependent upon and are directly protional to the intimacy with which the reacting molecules are brought into contact with each other. This can best be accomplished by a violent agitation of the liquid in intimate contact with the gases, or a contionuously proceeding process of collecting the liquid and immediately or simultaneously subdividing it again into a myriad of particles, as in the form of a fine spray, thereby presenting the greatest area of reacting surface between the gases and the liquids, this being the object of my invention.

I am aware that the introduction of liquids into chambers or towers in the form of spray, produced by specially designed nozzles through which the liquid is forced under high pressure sufficient to produce an atomizing effect, has been made the basis of previous processes for the manufacture of sulphuric acid but I do not claim the employment of this means for bringing about the intimate association or contact of the liquid and gaseous materials.

I am aware that various methods have been proposed for bringing the reacting gases and liquids in the manufacture of sulphuric acid into better contact than occurs in the usual lead chambers, but these prior methods either require the use of filling or packing material (such as in the well known Lunge towers) over which the liquid flows, or use mechanical agitators or splashing devices which do not produce a sufficiently minute subdivision of the liquid.

In my method, I use no packing materials or other means of support for liquid films, but depend upon the films on the minute liquid particles themselves, held in suspension in the gaseous atmosphere.

The area of film surface in actual contact with the gas is thus many thousand fold increased by the sub-division of the liquid in the form of mist or virtually fog particles.

Suitable apparatus for carrying out my process is illustrated somewhat diagrammatically in the accompanying drawings wherein—

Fig. 1 shows one arrangement of plant.

Fig. 2 is a section through one form of apparatus for finely subdividing liquid and bringing the particles into contact with gases.

Fig. 3 shows a modified arrangement of plant.

Having described the nature of the de-actions believed to take place in the manufacture of sulphuric acid, and furthermore having shown or indicated wherein and whereby these reactions can be accelerated or augmented, I will now disclose one method of accomplishing these desired ends, namely by producing the greatest possible area of reacting surface between the gaseous and liquid reagents, which method comprises the high degree of dispersion of the liquid phase within that of the gases, and also comprises the high degree of dispersion of the gaseous phase within that of the liquid.

To obtain this high dispersion of the liquid phase within that of the gases, I may employ any one of the well known rotary or centrifugal types of gas washers such as the Feld washer or vertical type, or the Theisen washer of horizontal type, and in the accompanying drawing (Figure 1) forming part of this specification, I have chosen the Feld washer, (shown in some detail in Fig. 2) for the purpose of illustrating one of the many ways of carrying my invention into effect. In Figure 1, the letter A designates the main flue conveying the sulfur-dioxide-bearing gases from the furnace or roasting apparatus to the Glover tower which may be of usual construction designated by the numeral 1. In the flue A is usually built the nitrating apparatus for generating the nitric acid and oxids of nitrogen required in the subsequent oxidizing reactions, these compounds mixing with the sulfur dioxid prior to entrance into the bottom of the Glover tower. From the Glover tower 1, the gases are drawn through the pipe B by means of the centrifugal fan or pressure blower C and are in turn forced into the Feld washer 9 which in this case serves as the apparatus wherein the usual "chamber reactions" are carried on, and by such adaptation entirely replaces the standard lead-chambers commonly used for these reactions. From the washer 9, the residual gases pass through the pipe D to the Feld washer 5 where the nitrogen compounds are absorbed, this washer 5 serving to perform the reactions usually accomplished by the use of Gay-Lussac towers. From the washer 5, the gases, substantially free from all valuable sulfur and nitrogen compounds, escape to the atmosphere. By means of the compressed air system G and H, the several acid-circulating systems are operated according to the usual practice in acid manufacture:—thus, (a) the denitrated and concentrated acid from Glover tower 1 is collected and cooled in the tank 2 and by means of the monteju 3 is pumped to the tank 4 which supplies the absorbing acid required in the washer 5, or any accumulated surplus of such acid may be diverted to the storage tank F for shipment or use as commercial sulfuric acid; and (b) from the washer 5, the niter-laden acid collects in tank 6 and by means of the monteju 7, is pumped to the tank 8 for distribution over the Glover tower 1 wherein it is again denitrated and concentrated, the released nitrogen compounds being thereby returned to the system; and (c) from the washer 9, the nitroso-sulphuric acid is collected in tank 10 and by means of the monteju 11 is pumped to tank 12 for re-circulation through the washer 9, or any accumulated surplus of such acid may be diverted to the Glover tower for denitrating and concentrating. Water is, of course, introduced into washer 9 and Glover tower 1, from time to time as may be required to maintain the proper working conditions and to supply the chemical reaction requirements.

It will be understood that the general arrangement of apparatus shown in Fig. 1 is only one method of carrying out my invention by means of a well known and commercially used type of gas-washer, and I do not wish to limit my invention to this particular arrangement of apparatus or to this particular type of apparatus or mechanism, but in order to make the application of my process more clearly understood, I shall illustrate by means of Fig. 2 the construction and operation of the Feld type of gas-washer. This particular apparatus consists of a number of separate washing chambers 20, mounted one above the other. The ports or openings 21 in the bottom of each chamber act as passages for the ascending gas, as well as overflows for the countercurrent flow of the absorbing liquid. The vertical shaft 22 suspended from a self-centering, anti-friction bearing 23 is provided in each chamber with a series of concentric frustrums of cones 24. The number of cones varies with the size of the apparatus. The spacing between the bottom of the chamber and the bottom edge of the cones increases toward the shell in order to provide for their equable immersion in the absorbing liquid, as well as to secure adequate agitation thereof. Such parts of this apparatus as come into contact with acid, are made of non-corrosive material such as lead, or are lead protected. When the vertical shaft 22 is revolved, these cones 24 pick up or pump the liquid which is thrown horizontally with considerable velocity through the outer perforated distributing cone. Additional impetus is given the liquid at this point by the greater rim speed of the distributor, and the liquid is projected through the gas space in the form of a fine, high velocity spray, which, upon impact with the shell, is still further broken up into a mist or fog, thus producing a very high dispersion of the liquid absorbing-medium, and through which, and in intimate contact therewith, the gases are compelled to pass.

Furthermore the violent agitation of the liquid within each chamber of this apparatus causes an enforced entrainment of the reacting gases within the circulating liquid medium. In other words, by the violent agitation of the liquid the reacting gases are dispersed in the form of minute bubbles, thus obtaining a dispersion of the gaseous phase within that of the liquid. This is evidenced by the fact that immediately upon discontinuance of the agitation it will be found that the liquid effervesces due to the escape of the minute gas bubbles. These combined methods of dispersion, namely, (a) that of the liquid phase within the gaseous one and, (b) the dispersion of the gaseous phase within that of the liquid, together with the alternating humidifying and scrubbing effect to which the gases are subjected in each chamber, provides a means of enforcing the intimacy of contact and the extended area of reacting surface between gases and liquid necessary to accelerate and augment the chemical reactions involved in the manufacture of sulphuric acid, this being the object of my invention.

There is moreover a continuous circulation of liquid within each washing chamber.

In a plant, as is shown in Fig. 1, I have been able to oxidize one pound of sulfur in less than one tenth of a cubic foot of reaction space, whereas in the common practice in chamber acid manufacture, there is required from 6 to 12 cubic feet of reaction space.

The production of high dispersion of the liquid and gases by such a method as above described, enables me to use a considerable pressure throughout the system, such pressure, as above pointed out, enhancing the reactions. Such pressure may be many times greater than can be used in ordinary lead chambers. For example, I have used pressure up to 16 pounds absolute pressure, and this pressure may be increased to the extent that economical operation will warrant.

In my process I provide for counterflow of gases and liquids, which results in the establishment of more uniform and more complete oxidation of $SO_2$ throughout the system. Thus referring to Fig. 2, the gases rich in $SO_2$ and oxygen entering through the gas inlet are brought into contact with weaker nitrous vitriol, while as they ascend through the washer, they come into contact with nitrous vitriol of gradually increasing strength. There results a uniform as well as a more complete oxidation of the $SO_2$, and the occurrence of the objectionable reaction, such as is indicated in equation 9, will be prevented.

In Fig. 3 I have illustrated an improved method of circulating the acid liquids such as may be used in carrying out my invention but in a manner which is not possible in the usual method of manufacturing sulphuric acid by the chamber process. Thus, in general practice, the niter-laden acid obtained from the Gay-Lussac towers is passed over the Glover tower, therein to be denitrated and concentrated and then returned to the Gay-Lussac towers for use again in absorbing the nitrogen compounds; these two units, the Glover tower and the Gay-Lussac towers, acting as in a closed-circuit with each other. Meanwhile, the sulphuric acid formed by the "chamber reactions" accumulates and remains stagnant in the chambers except as portions are drawn off, from time to time, to be concentrated in the Glover tower, therefore, this acid reacts but feebly with the gases while within the chambers and at the same time retains a considerable quantity of valuable nitrogen compounds in a substantially inactive state. But by my improved method, the "chamber acid" is made to react energetically with the sulfur-dioxid contained in the gases; also, the acid from the Gay-Lussac tower is caused to react with sulfur dioxid and so is partly denitrated before passing to the Glover tower; and by these means I am able to greatly increase the amount of acid made within a given reaction space and to affect a considerable economy in niter consumption, thereby producing sulphuric acid at lesser cost than by the usual methods. This is accomplished as illustrated in Fig. 3 where the numeral 1 designates the Glover tower, through which the sulfur-dioxid-bearing gases are drawn by the centrifugal fan C and are in turn forced through the reaction tower 9 and thence through the absorption tower 5, from which the residual gases escape to the atmosphere. By means of the compressed air system G and H, the several acid-circulating systems are operated in the following manner; thus, (a) the denitrated and concentrated acid from the Glover tower 1 is collected and cooled in the tank 2 and by means of the monteju 3 is pumped to the tank 4 which supplies the absorbing acid required in the absorption tower 5, or any accumulated surplus of such acid may be diverted to the storage tank F for use as commercial sulphuric acid; and (b) from the absorption tower 5, the niter-laden (nitroso-sulphuric) acid collects and is cooled in tank 6 and by means of the monteju 7 is pumped to the tank 12 for circulation through the reaction tower 9 wherein the nitroso-sulphuric acid, together with a requisitely added amount of water, reacts with the sulfur-dioxid entering from the Glover tower 1, the reaction tower 9 thus functioning as ordinarily do the usual lead-chambers but the reactions take place much more energetically and rapidly and are more readily controlled in the reaction tower 9 than in the commonly used lead-chambers; and (c) from the reaction tower 9, the acid is collected in tank 10 and by means of the monteju 11 is pumped to tank 8 for circulation through the Glover tower 1 and therein to be denitrated and concentrated in the usual manner. By means of these acid-circulating systems, the proper quantities and qualities of circulating acids, cooled to the proper working temperatures, can be easily kept under control so as to maintain a uniformity of the quantitative and qualitative factors throughout the whole cycle of the chemical reactions; for, owing to the rapid circulation of both the gaseous and the liquid materials and the conveniently afforded means of regulating the quantities of these materials in varying proportion to each other, faulty conditions of operation can be promptly ascertained and corrections as promptly made, this elasticity of control being of the greatest importance in the manufacture of sulphuric acid.

My invention has been found in practice to be particularly effective in the recovery of nitrogen compounds from the gases which are ordinarily delivered to the Gay-Lussac towers.

In these towers sulphuric acid is ordinarily employed as the absorbent medium. I have found that my method involving the high dispersion of the liquid phase is equally applicable to other liquids than sulphuric acid. Thus the nitrogen compounds may be absorbed by alkaline liquids instead of acids, from which they can be subsequently liberated by well known methods for re-use.

My system provides for control of the essential conditions in the efficient manufacture of sulphuric acid in that it enables the temperatures, pressures and concentration of gases to be separately regulated.

I claim:

1. In the process of making sulphuric acid, the method of accelerating and augmenting the reactions between liquid and gaseous phase components which consists in bringing the molecules of such reacting components in enforced intimate contact, one of said phases being in such a state of high dispersion as to present the maximum area or reacting surface between the gases and liquids.

2. The process as claimed in claim 1 in which the reacting gases are brought into contact with minutely subdivided liquid particles held in suspension in the form of mist or fog.

3. The process as claimed in claim 2, in which the minute subdivision of the liquid particles is effected by mechanical means.

4. The process of manufacturing sulphuric acid which consists in introducing gases reacting to form sulphuric acid into a Glover tower, introducing the gases from the Glover tower into a reacting chamber in which the gases and liquids are brought into enforced intimate contact, as specified in claim 1, delivering the gases from the reacting chamber into an absorption tower, and delivering the acid liquid from the absorption tower to the reacting chamber, the acid liquid from the reacting chamber to the Glover tower and the sulphuric acid from the Glover tower to the absorption tower and to storage.

5. A plant for manufacturing sulphuric acid comprising a Glover tower, a reaction tower, and an absorption tower, means for passing gases through the towers in series, means for collecting and cooling the acid liquid from each tower, means for delivering acid from the Glover tower to the absorption tower, means for delivering acid from the absorption tower to the reaction tower, and means for delivering acid from the reaction tower to the Glover tower.

6. The method of recovering nitrogen compounds from gases containing the same by means of a liquid medium which consists in bringing the molecules of liquid and gas into enforced intimate contact, the liquid being in such a state of high dispersion as to present the maximum area of reacting and adsorbing surface between the gas and liquid.

7. The process as claimed in claim 1 in which the gaseous phase component is maintained under pressure sufficient to accelerate the reaction.

8. The process as claimed in claim 3, which consists of a continuously proceeding method of collecting the liquid phase components and immediately or simultaneously subdividing them again into a myriad of particles, as in the form of mist or fog.

9. The process as claimed in claim 3, which consists of a continuously proceeding method of dispersing the liquid phase components in order to produce newly formed surface films for the adsorption of the gaseous phase components and immediately or simultaneously causing the disruption of such adsorbed films substantially as soon as formed, by coalescence in a collecting mass of liquid, said dispersion and coalescence continuing in a rapidly repeated cyclic order.

10. The process as claimed in claim 1, which consists of a continuously proceeding method of dispersing the gaseous phase components within the liquid absorbing medium as in the form of minute bubbles of gases, which is effected by mechanically producing a violent agitation of said liquid absorbing medium in contact with and in the atmosphere of said gaseous phase components.

11. The process as claimed in claim 1, which consists of a continuously proceeding method of forcing the gaseous phase components into the liquid phase components in the form of minutely subdivided bubbles of the gases, which is effected by a violent agitation, of said liquid phase components, produced by mechanical means.

12. In a process of making sulphuric acid by oxidation of sulphuric dioxide in presence of water, the method of accelerating the reaction between liquid and gaseous phase components, which consists in alternately and repeatedly dispersing the liquid phase into a gaseous phase and re-collecting the same.

13. In the process of making sulphuric acid, the method of accelerating and augmenting the reaction between liquid and gaseous phase components, which consists in dispersing the liquid phase into a gaseous phase, re-collecting the liquid and continuously cooling and circulating the liquid.

14. In the process of making sulphuric acid, the method of accelerating and augmenting the reaction between liquid and gaseous phase components, which consists in alternately and repeatedly dispersing the liquid phase into a gaseous phase, re-collecting the liquid, and continuously cooling and circulating the liquid.

15. The process of manufacturing sulphuric acid which consists in introducing gases reacting to form sulphuric acid into a Glover tower, introducing the gases from the Glover tower into a reacting chamber in which the gases and liquids are brought into enforced intimate contact, as specified in claim 1, delivering the gases from the reacting chamber into an absorption tower, and recovering the nitrogen compounds from the gases by intimate mixture with sulphuric acid.

16. The process as claimed in claim 15 in which the recovery of nitrogen compounds is effected by bringing the molecules of liquid and gas into enforced intimate contact, the liquid being in such a state of high dispersion as to present the maximum area of reacting and adsorbing surface between the gas and liquid.

In testimony whereof, I affix my signature.

WILLIAM F. LAMOREAUX.